Figure 1:
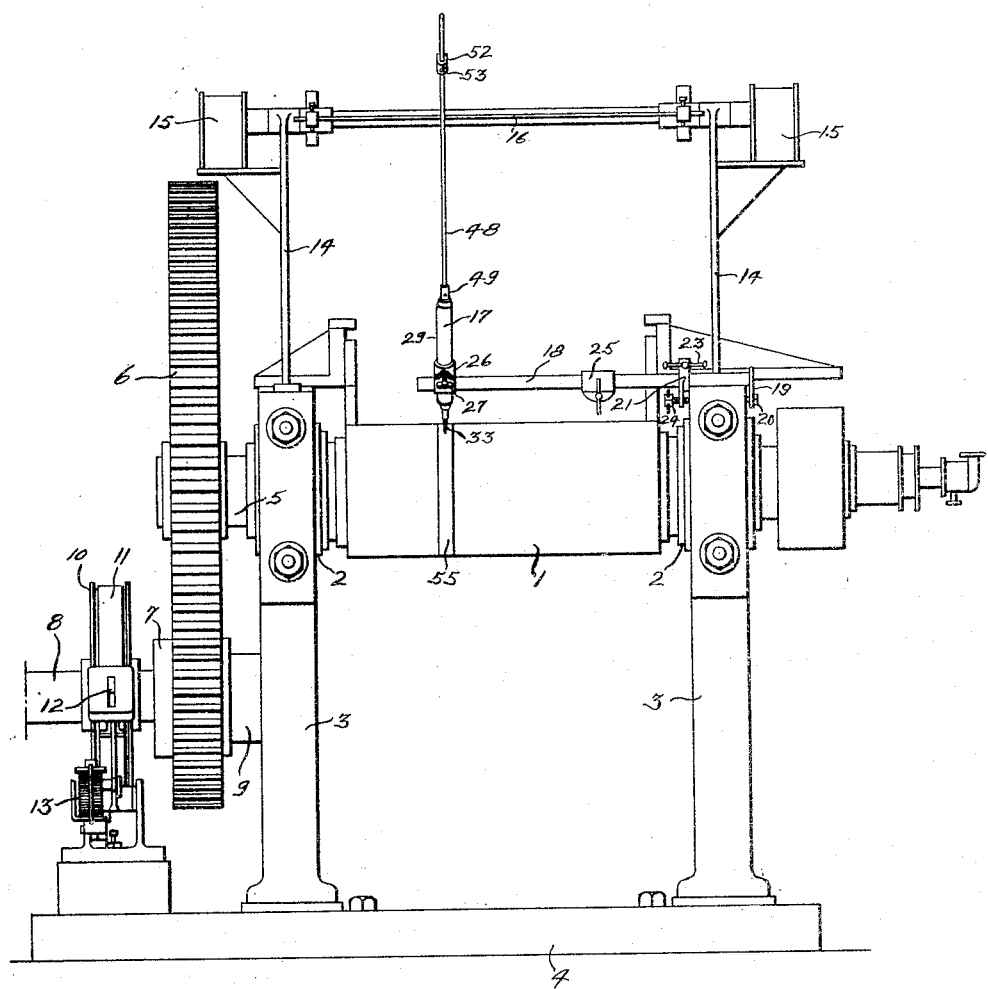

Nov. 8, 1932.   J. E. THROPP   1,887,442
ROLL TRAVEL TESTING APPARATUS
Filed Dec. 18, 1930   2 Sheets-Sheet 1

Nov. 8, 1932.   J. E. THROPP   1,887,442
ROLL TRAVEL TESTING APPARATUS
Filed Dec. 18, 1930   2 Sheets-Sheet 2

Patented Nov. 8, 1932

1,887,442

UNITED STATES PATENT OFFICE

JOHN EXTON THROPP, OF TRENTON, NEW JERSEY

ROLL TRAVEL TESTING APPARATUS

Application filed December 18, 1930. Serial No. 503,304.

This invention relates to means for testing and measuring the travel of certain machine parts, such as rotating rolls, after the machine has been rendered inoperative by the shutting off of, or otherwise rendering ineffective, the source of energy for the machine. The device of the invention is particularly adapted for use with machines such as rubber mixing machines, and is illustrated in the present instance as being associated with such a machine. However, it is to be understood that the invention is applicable to any machine with which it may be associated to perform its desired function. The present application provides a device whose function is similar to that of the device disclosed in co-pending application Serial No. 494,121, filed November 7, 1930, the present invention being a modification of the invention disclosed in said co-pending application. The device of that application is controlled electrically, while the device of the present application is controlled mechanically.

As is generally known, there are certain rules and regulations imposed by various authorities upon the travel of rotating rolls or the like after a machine has been shut down and the brake applied. Safety is perhaps the chief reason for such regulations, it being desired to stop such rolls as quickly as possible when the machine is shut down in an emergency, such as, for example, when an operator gets caught therein. Accordingly, is is the object of this invention to provide simple and efficient means for accurately testing the travel of rotating rolls or the like from the time the machine is shut down until its brake completely stops it, thereby stopping the rolls. Such means will readily enable the determination of whether or not the regulations referred to are being complied with in any particular instance.

It is a further object of the invention to provide means of the type indicated which comprises a portable outfit that may be conveniently carried about from one installation of machinery to another. The device comprises essentially a mechanically operated marking device adapted for actuation by a control element of the machine with which the device is associated to mark the travel of a part of the machine after the control element has been actuated to shut down the machine.

The details of construction of a device constructed in accordance with the principles of the invention, as well as the method of using and operating the same, will be clearly understood from the following description and the accompanying drawings.

Figure 2:
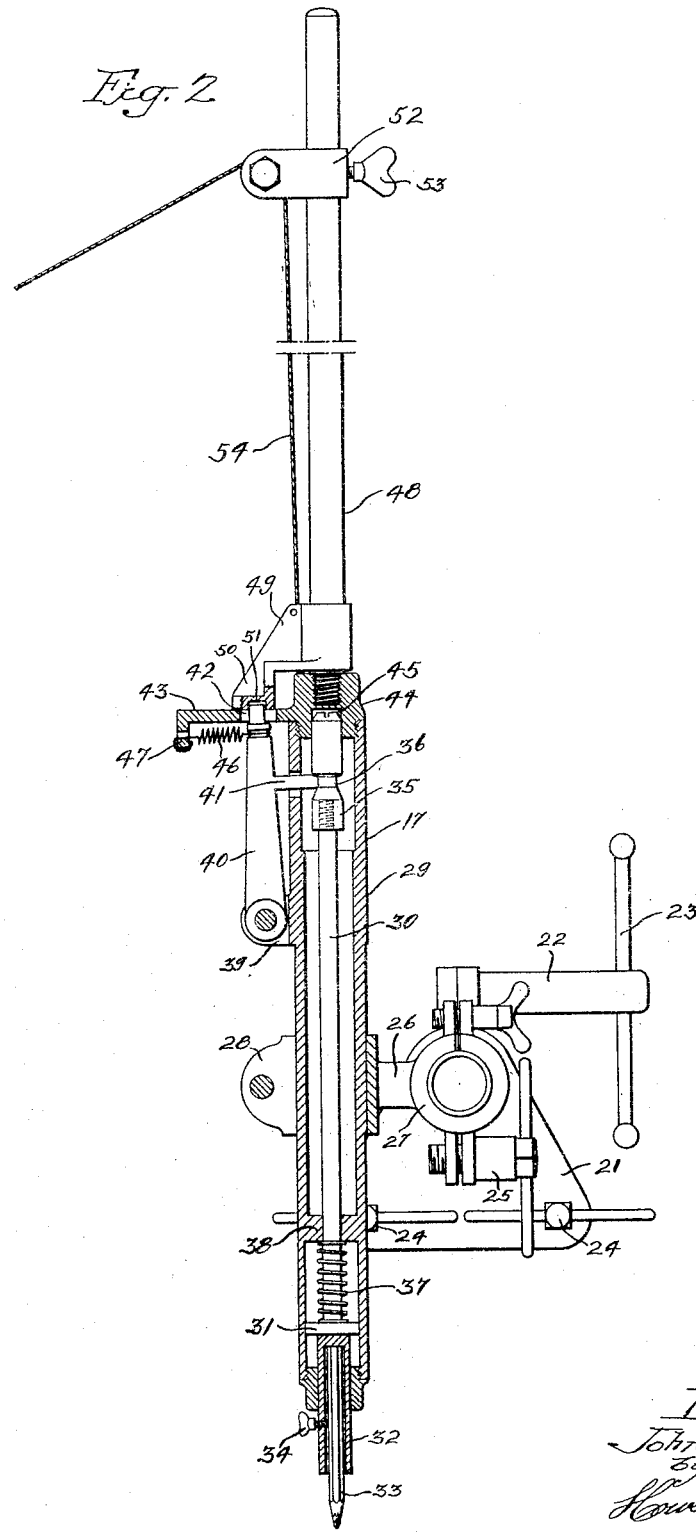

In the drawings:

Fig. 1 is an elevational view of a rubber-mixing machine having associated therewith the device of my invention; and Fig. 2 is a detail view, partly in section, of the device of the invention.

Referring to Fig. 1, there is shown a rubber-mixing machine which may be of the type disclosed and described in detail in my prior Patent No. 1,621,442, dated March 15, 1927. For the purpose of the present invention, it will be sufficient to describe briefly the machine disclosed, reference being had to the aforementioned patent for a more detail description of the machine, if such is desired. In the figure, there is illustrated a mixing roll 1 which is one of a pair of horizontally adjacent rolls adapted to mix or grind material passing therebetween. Roll 1 is journaled in bearings 2, which are supported by vertical standards 3. These standards are, in turn, mounted upon the base plate or frame 4 of the machine. One of the rolls referred to, for example roll 1, is provided with a projecting shaft 5, which carries at its end a large gear 6. Gear 6 meshes with, and is driven by, a pinion 7 mounted on one end of shaft 8. Shaft 8 is journaled at one end in bearing 9 mounted on standard 3 and carries a brake drum 10. Brake lining 11 is operatively associated with the brake drum, and is adapted to be brought into operative relation with the said drum through the medium of a weighted brake arm 12 and a solenoid 13. The manner in which the brake of the machine is actuated forms no part of the present invention and a description thereof is unnecessary here. Such operation may be determined in detail from the disclosure of the aforementioned patent.

The other end of shaft 8 may be journaled in a suitable bearing (not shown) mounted on the base plate. A suitable electric motor or other driving means not shown may be provided to drive the machine, and to that end may be suitably geared to shaft 8.

Standards 3 carry at their upper ends vertical supporting rods 14. A pair of switches 15 are carried by the supporting rods, and a pair of horizontally disposed rods 16 (one being hidden from view) are pivotally supported and adapted to actuate switches 15 to open them when moved down. Switches 15 may be connected in the under voltage release coil of the circuit breaker provided in the circuit of the driving motor. A complete circuit diagram including these switches, and showing the manner in which they cooperate with the remainder of the electrical system, will be found in the disclosure of the aforementioned patent. For the purpose of the present invention, it suffices to state that rods 16 are provided so that the operator may quickly shut down the machine in an emergency by merely reaching up and moving the rods. If the operator should have a portion of his body or clothing caught in the rolls, for example, he can readily stop the machine by means of the rods.

In accordance with my invention, I provide a marking device which is adapted to be supported adjacent a roll of the machine to indicate the travel thereof after the machine has been shut down, such device being mechanically attached to and operated by one of the horizontal rods 16. This device is indicated in Fig. 1 by reference character 17. It will be understood, of course, that any suitable support may be used to carry device 17. In the present instance, the device is mounted upon a horizontal pipe 18 which is clamped at one end to the upper portion of bearing standard 3. To this end, a stationary friction clamp 19 is provided at the end of pipe 18 and is adapted to engage one side of standard 3. Such clamp may, of course, be formed integral with pipe 18 or may take the form of a separate element suitably attached to such pipe. It will be understood, of course, that the clamp is provided with suitable spikes 20 which are adapted to bite into the surface of standard 3.

A second friction clamp 21 is slidably mounted upon pipe 18 and is adapted to coact with clamp 19 to firmly embrace standard 3. This clamp may be formed to have a split upper portion which may be provided with a suitable adjusting bolt 22 (see Fig. 2). While the details of this bolt are not shown, it will be understood as a mechanical expedient that a reduced threaded shank on the end thereof may extend through the split portions of clamp 21, and may threadedly engage one portion to draw it toward the other portion when handle 23 is operated. Clamp 21 may be provided with adjustable spikes 24 which are adapted to bite into the other side of standard 3. By means of this construction, it will be apparent that a rigid support for pipe 18 is obtained. While the pipe 18 may be formed in a single piece, I prefer to use two pieces of such pipe for the sake of ease of transportation. A split collar clamp 25 may be used to rigidly join the two pieces of pipe together. Obviously, any number of joined sections of pipe may be used.

The details of construction of the marking device are clearly shown in Fig. 2. This device is carried at the opposite end of pipe 18 by means of a suitable supporting bracket 26. Such bracket may be integrally formed to provide a pair of split collar clamps 27 and 28, the former embracing pipe 18, while the latter embraces the marking device. By means of such a supporting bracket, the marking device is adjustable horizontally along pipe 18 and is also adjustable longitudinally perpendicularly to pipe 18.

The marking device comprises a tubular casing 29 and a pencil supporting rod 30 mounted therein for longitudinal movement. The lower end of rod 30 is formed to provide an integral shoulder 31 and a sleeve 32. The sleeve is adapted to receive a suitable pencil or other marking device 33 which may be retained within the sleeve by means of a set screw 34. The upper end of rod 30 is threaded to receive head 35 which is provided with an annular notch 36, whose purpose will appear hereinafter. A coil spring 37 encircles the lower portion of rod 30 and functions to normally urge the rod downward with respect to the tubular casing 29. The casing has a restricted portion 38 which serves as a bearing for rod 30 and also provides a bearing surface for one end of spring 37. The other end of the spring rests upon shoulder 31. It will be apparent that the spring will urge the rod and the pencil carried thereby downward unless such downward motion is prevented.

Casing 29 is provided with integral ears 39 between which a latch 40 is pivotally mounted. The latch is thus pivoted at one end and carries an integral finger 41 which is adapted to extend through opening in casing 29 and to engage the annular notch 36 in head 35. The upper end of the latch is adapted to ride in a slot 42 provided in a laterally extending arm 43 of cap 44. The cap is threadedly carried upon the upper end of casing 29, and is recessed as at 45 to provide a support and bearing surface for the upper part of the pencil assembly. A spring 46 connected between latch 40 and a downwardly extending projection 47 on the end of arm 43 normally urges the latch outward to release rod 30.

A rod 48 has its lower end threaded and is carried by cap 44, which is provided with a threaded aperture to receive it. A latch retainer 49 is slidably carried by rod 48 and has a downwardly extending portion 50, which is recessed as at 51 to receive the upper end of latch 40. The weight of the latch retainer tends to carry it downward to the position shown in Fig. 2, in which position it serves to retain the latch in operative position with respect to the pencil assembly against the action of spring 26. An adjustable pulley supporting device 52 is provided at the upper end of rod 48 and may be adjusted along the rod by means of set screw 53. A flexible cord 54 or like element has one end attached to the latch retainer and passes over a pulley (not shown) carried by support 52. The other end of the cord may be attached to one of the horizontal rods 16 which form a part of the rubber-mixing machine, as previously described.

In using the device, it is first attached to the machine in the manner previously described and then adjusted with respect to roll 1. If desired, a suitable strip of paper 55 may be placed around roll 1 to receive the marking of the pencil. The marking may of course, be made upon the roll itself, but the use of a paper strip has the advantages that it indicates the marking more clearly and can be used for filing purposes. The device is adjusted so that the pencil 33 is disposed slightly above the roll when latch 40 is in its operative position to hold the pencil assembly in raised position against the action of spring 37. With rod 16 in position corresponding to the closed position of switches 15, cord 54 is drawn taut and connected in any suitable manner to rod 16. Assume now that the machine has been started and that it is desired to measure the travel of roll 1 from the time that the machine is shut down by means of control rod 16 and the actual stopping thereof by the brake. Rod 16 may be moved downward to open switch 15 and thereby shut off the motor current as previously described. The downward movement of rod 16 exerts a pull upon cord 54, thereby raising the latch retainer and allowing spring 46 to draw latch 40 outwardly. This releases the pencil assembly and allows spring 37 to forcibly move such assembly downward, causing pencil 33 to engage the roll or paper strip and indicate thereon the travel of the roll. Simultaneously with the shutting down of the machine by the operator, the brake is applied through the medium of solenoid 13 and functions to bring the rolls to rest. The mark made by the pencil will, of course, indicate the travel of the roll prior to the actual stopping thereof by virtue of the brake. The device may be reset manually if it is desired to repeat the operation.

Obviously, the device provided by my invention is simple in construction but operates in an efficient manner to accomplish the desired end. An important feature of the device is that it can be readily disconnected and carried about in a convenient manner. It will, therefore, be apparent that such a device will find ready application in the testing of machines of the character indicated and disclosed. Since there are comparatively few and simple parts in the device, there is little danger of it getting out of order.

Various changes and modifications in the device of the invention may, of course, be made without departing from the spirit of the invention. For example, the particular mounting of the device with respect to the machine may be varied in any suitable manner. Likewise, the device may be controlled from any suitable element of the machine other than the horizontal rods, so long as such element functions to shut down the machine. Such changes therefore as come within the scope of the appended claims are contemplated by the invention, which is to be limited only by the scope of the claims.

I claim:

1. The combination with a machine having control means and rotatable rolls, of means for measuring the travel of a roll after said machine has been rendered inoperative, said measuring means comprising marking means disposed adjacent said roll, means urging said marking means in cooperative relation with said roll to mark the same, and means controlled mechanically by said control means for rendering said urging means ineffective until said control means is operated.

2. The combination with a machine having control means and rotatable rolls, of means for measuring the travel of a roll after said machine has been rendered inoperative, said measuring means comprising marking means disposed adjacent said roll, a spring urging said marking means against said roll to mark the same, a latch adapted to hold said marking means, thereby rendering said spring ineffective, and means controlled by said control means for retaining said latch in operative position during operation of said machine and for releasing said latch upon operation of said control means to stop the machine, whereby said marking means is rendered effective.

3. The combination with a machine having a control device and rotatable rolls, of means for measuring the travel of a roll after the machine has been rendered inoperative, said measuring means comprising marking means disposed adjacent said roll, a spring urging said marking means against said roll to mark the same, a latch adapted to hold said marking means, thereby rendering said spring ineffective, and means controlled by said control device for retaining said latch in operative position when said device is in one position and said machine is operating, and for releasing said latch upon movement of said device to a second position to stop the machine, whereby said marking means is rendered effective.

4. Portable testing apparatus for measuring the travel of a machine part from the time said machine is shut down until it stops, comprising a portable marking device, a portable support for said device, whereby said device may be positioned adjacent said machine part to engage the same, and a detachable connection for connecting said marking device to a control element of said machine, whereby said device may be controlled by said control element.

5. Portable testing apparatus for measuring the travel of a machine part from the time said machine is shut down until it stops, comprising a portable marking device, means for detachably mounting said device on said machine adjacent said part to engage the same, and a detachable connection for connecting said marking device to a control element of said machine, whereby said device may be controlled by said control element.

6. Portable testing apparatus for measuring the travel of a machine part from the time said machine is shut down until it stops, comprising a portable marking device, a portable support for said device, whereby said device may be positioned adjacent said machine part to engage the same, and a detachable connection for operatively associating said marking device with a control element of said machine, whereby said device may be controlled by said control element, said device comprising a marking element, means urging said marking element into operative position, and means for rendering said urging means ineffective, said last means being controlled by said control element.

JOHN EXTON THROPP.